(12) United States Patent
Lund et al.

(10) Patent No.: US 12,407,287 B2
(45) Date of Patent: Sep. 2, 2025

(54) GENERATOR POWER PEAK LIMITING IN VIRTUAL SYNCHRONOUS MACHINE WIND TURBINE

(71) Applicant: VESTAS WIND SYSTEMS A/S, Aarhus (DK)

(72) Inventors: Torsten Lund, Fredericia (DK); John Godsk Nielsen, Hornslet (DK); Esmaeil Ebrahimzadehveshareh, Aalborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/723,359

(22) PCT Filed: Dec. 15, 2022

(86) PCT No.: PCT/DK2022/050284
§ 371 (c)(1),
(2) Date: Jun. 21, 2024

(87) PCT Pub. No.: WO2023/117004
PCT Pub. Date: Jun. 29, 2023

(65) Prior Publication Data
US 2025/0062709 A1 Feb. 20, 2025

(30) Foreign Application Priority Data
Dec. 22, 2021 (DK) .............. PA202170656

(51) Int. Cl.
H02P 21/00 (2016.01)
F03D 7/02 (2006.01)
H02P 21/05 (2006.01)
H02P 21/18 (2016.01)
H02P 21/22 (2016.01)
H02P 101/15 (2016.01)
H02P 103/20 (2016.01)

(52) U.S. Cl.
CPC ............. H02P 21/22 (2016.02); F03D 7/0284 (2013.01); H02P 21/05 (2013.01); H02P 21/18 (2016.02);
(Continued)

(58) Field of Classification Search
CPC .......... H02P 21/22; H02P 21/05; H02P 21/18; H02P 2101/15; H02P 2103/20; F03D 7/0284; F05B 2270/1033; F05B 2270/337
See application file for complete search history.

(56) References Cited

U.S. PATENT DOCUMENTS 11,715,955 B2 * 8/2023 Nielsen .............. F03D 7/0284
290/44
11,863,112 B2 * 1/2024 Ebrahimzadehveshareh ...............
H02J 3/381
(Continued)

FOREIGN PATENT DOCUMENTS

CN 108092302 A 5/2018
CN 108683198 A 10/2018
(Continued)

OTHER PUBLICATIONS

Danish Patent and Trademark Office, 1st Technical Examination including The Search Report and Opinion for Application PA 2021 70656 dated Jun. 7, 2022.
(Continued)

Primary Examiner — Julio C. Gonzalez
(74) Attorney, Agent, or Firm — Patterson + Sheridan, LLP; Gero G. McClellan; Charles Yeh (57) ABSTRACT

Limiting generator loads in a wind turbine having a power converter with a line side inverter configured as a grid forming inverter. A maximum grid current value is determined based on a measured generator load and a limit function. A virtual impedance value and a virtual voltage
(Continued)

drop over the virtual impedance value are determined. A virtual synchronous machine angle is determined based on a power reference and the virtual grid power. The voltage reference for controlling the line side inverter is determined based on the virtual synchronous machine angle, the virtual voltage drop and the voltage magnitude reference.

15 Claims, 7 Drawing Sheets

(52) U.S. Cl.
CPC . *F05B 2270/1033* (2013.01); *F05B 2270/337* (2013.01); *H02P 2101/15* (2015.01); *H02P 2103/20* (2015.01)

(56) References Cited

U.S. PATENT DOCUMENTS 12,031,523 B2 * 7/2024 Ebrahimzadehveshareh ............... H02P 23/04
12,176,842 B2 * 12/2024 Ebrahimzadehveshareh ............... H02P 9/02

2018/0145582 A1 5/2018 Shuai et al.

FOREIGN PATENT DOCUMENTS

| CN | 111416393 A | 7/2020 |
| WO | 2020135905 A1 | 7/2020 |
| WO | 2021008664 A1 | 1/2021 |
| WO | 2021029313 A1 | 2/2021 |

OTHER PUBLICATIONS

PCT International Search Report and Written Opinion of The International Searching Authority for Application PCT/DK2022/050284 dated Apr. 28, 2023 (Apr. 28, 2023).

Shi Chen et al., "An adaptive current protection for distributed network with wind generators," 2016 IEEE Power and Energy Society General Meeting (PESGM), Boston, MA, 2016, pp. 1-5. [Abstract only].

C. He et al, "Research on Low Voltage Ride Through Capability of DFIG Based on Adaptive Crowbar Resistor," 2018 37th Chinese Control Conference (CCC), Wuhan, China, 2018, pp. 8930-8935. (Abstract only).

* cited by examiner

GENERATOR POWER PEAK LIMITING IN VIRTUAL SYNCHRONOUS MACHINE WIND TURBINE

FIELD OF THE INVENTION

The invention relates to control of power generation in wind turbines, and particularly control of wind turbines configured to exhibit a virtual synchronous generator response.

BACKGROUND OF THE INVENTION

In order to allow a much higher penetration of renewable energy sources such as wind turbines into the electrical grid, some countries propose requirements to equip the power converters with grid-forming properties similar to conventional synchronous generators. These requirements can be address by configuring the renewable power generating units as virtual synchronous machines VSM.

When the VSM configured wind turbine is operated with a high overcurrent threshold a grid disturbance such as a phase jump can lead to high peak in the generator power and/or generator torque and consequently an undesired mechanical peak load.

Accordingly, it is a problem that wind turbines configured as synchronous machines may experience high mechanical loads in response to grid disturbances. Hence, an implementation of the virtual synchronous machine which addresses this and other problems is needed.

SUMMARY OF THE INVENTION

It is an object of the invention to improve control wind turbines configures as virtual synchronous machines to alleviate the above mentioned problems with wind turbine loads.

In a first aspect of the invention, a method for limiting generator power or generator torque levels in a wind turbine comprising a power converter with a line side inverter arranged to supply power to a power grid, the method comprises determining a maximum grid current value based on a measured generator load and a limit function which sets an upper maximum grid current value and a lower maximum grid current value so that the maximum grid current value approaches the lower maximum current value if generator load is greater than a maximum generator load and so that the maximum grid current value approaches the upper maximum current value if the generator load is smaller than the maximum generator load or is smaller than a low maximum generator load, determining a virtual impedance value based on a current difference between a current magnitude which relates to a grid current and the maximum grid current value, where the virtual impedance value comprises a virtual resistance value and optionally a virtual reactance value, determining a virtual voltage drop over the virtual impedance value based on the virtual impedance value and the grid current, determining a virtual grid power based on the virtual resistance value and the grid current, or based on the grid current and a voltage magnitude reference for a desired grid voltage or a desired reactive power to be generated by the line side inverter, determining a virtual synchronous machine angle based on a power reference for a desired power output of the power generating unit and the virtual grid power according to the virtual synchronous machine control scheme, determining a voltage reference for controlling the line side inverter to generate power based on the virtual synchronous machine angle, the virtual voltage drop and the voltage magnitude reference.

The method is particularly advantageous for wind turbines wherein the line side inverter is controlled according to a grid forming inverter scheme, i.e. wherein the virtual synchronous machine angle $\theta VSM$ is determined according to the grid forming inverter scheme such as a virtual synchronous machine scheme.

By limiting the maximum grid current value to the lower maximum current value when the generator load is greater than a maximum generator load, peaks in the generator load is reduced, at least in comparison with a solution where the maximum grid current value is not limited.

By limiting the maximum grid current value to be between the lower maximum current value, which may be greater than zero, and the upper maximum current value the determination of a very small threshold value or a very large threshold value is avoided.

According to an embodiment, determining the maximum grid current value comprises determining a load difference between the measured generator load and the maximum generator load, integrating the load difference and determining the maximum grid current value based on the integrated load difference subject to the upper maximum grid current value and the lower maximum grid current value of the limit function.

Advantageously, by determining the maximum grid current value based on integrating the load difference, changes between the lower and upper maximum grid current values occurs gradually and wherein the rate of change depends on the magnitude of the load difference.

According to an embodiment, integrating the load difference comprises multiplying the load difference with a gain factor which depends on the load difference.

Advantageously, by use of an adaptive gain factor the rate of change can be adjusted. For example, by determining the gain factor dependent on the sign of the load difference, a fast change towards the lower maximum grid current can be achieved to ensure that the generator load peak will be limited, while a slower change towards the upper maximum grid current is achieved, e.g. for stability purposes.

According to an embodiment, determining the maximum grid current value comprises selecting the lower maximum grid current value if the measured generator load is greater than the maximum generator load and selecting the upper maximum grid current value if the measured generator load is smaller than the low maximum generator load, and determining the maximum grid current value by limiting a rate of change of changes between the upper maximum grid current value and the lower maximum grid current value.

According to this embodiment, the maximum grid current value is determined from a hysteresis function where the threshold values are given by the maximum generator load and the low maximum generator load. To avoid instant changes in the maximum grid current value, a rate limiter may be used to limit the rate of change.

According to an embodiment, the virtual synchronous machine angle $\theta VSM$ is determined so that the double derivative of the angle $\theta VSM$ is indicative of a deviation between a power reference Pref and the virtual grid power Pvsm combined with a damping power Pd.

According to an embodiment, the virtual resistance value is determined based on a control algorithm, where the control algorithm comprises a proportional part which determines a value which is proportional with the current difference and/or an integral part which determines a value which is proportional with a time integral of the current difference.

Advantageously, by determining the virtual resistance value of the virtual impedance based on a control algorithm the virtual resistance is based on the magnitude of the current difference and possibly dependent on the integration of the error over time. This method may provide a stable determination of the virtual resistance.

According to an embodiment, the integral part comprises an integral gain which is determined dependent on the current difference, such as the sign of the current difference.

Advantageously, the integral gain could be large for positive current errors to provide fast current limitation. For negative current errors, a smaller gain can be used to provide a stable response under unbalanced cases. In an example, the method comprises limiting the virtual resistance value according to minimum and maximum limits According to an embodiment, the virtual reactance value of the virtual impedance value is determined dependent on a predetermined factor defining a ratio between the virtual reactance value and the virtual resistance value.

According to an embodiment, the current magnitude is determined as the maximum current magnitude of the current magnitudes of the current phases of the grid current, or as the magnitude of the current vector of the grid current or a transformation thereof.

According to an embodiment, the virtual synchronous machine rotational speed is determined based on a combination of a feedback of a damping power, the power reference, the virtual grid power and an inertial integration model, where the synchronous machine angle is determined based on an integration of the synchronous machine rotational speed, and where the damping power is determined based on the virtual synchronous machine rotational speed.

According to an embodiment, the method comprises
obtaining a network voltage at a connection point of the output of the power generating unit,
determining a rotational speed of the grid based on the network voltage, and
determining the damping power based on the virtual synchronous machine rotational speed and the rotational speed of the grid.

According to an embodiment, the method comprises determining a modified voltage reference by combining the voltage magnitude reference, or a transformation thereof, with the virtual voltage drop, and
determining the voltage reference based on the modified voltage reference.

The voltage magnitude reference may be defined in a DQ frame.

According to an embodiment, the method comprises transforming the voltage magnitude reference to a transformed voltage magnitude reference in non-rotating target frame, wherein the modified voltage reference is determined by combining said transformed voltage magnitude reference with the virtual voltage drop.

A second aspect of the invention relates to a wind turbine control system arranged for limiting generator power or generator torque levels in a wind turbine comprising a power converter with a line side inverter arranged to supply power to a power grid, wherein the wind turbine control system is arranged to perform the method of the first aspect.

A third aspect of the invention relates to a wind turbine comprising a control system according to the second aspect.

BRIEF DESCRIPTION OF THE DRAWINGS

Embodiments of the invention will be described, by way of example only, with reference to the drawings, in which.

DETAILED DESCRIPTION

Figure 1:
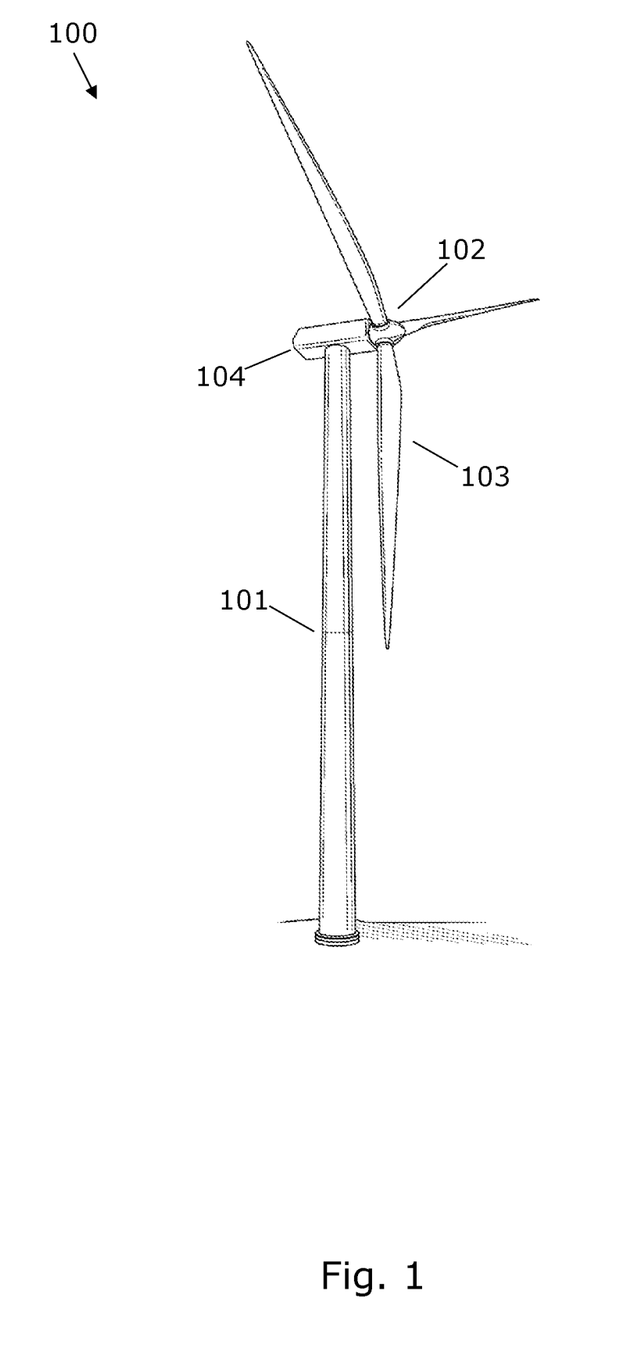
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a line side inverter. The generator side converter converts the generator AC power into DC power and the line side inverter converts the DC power into an AC power for injection into the utility grid.

Figure 2A:
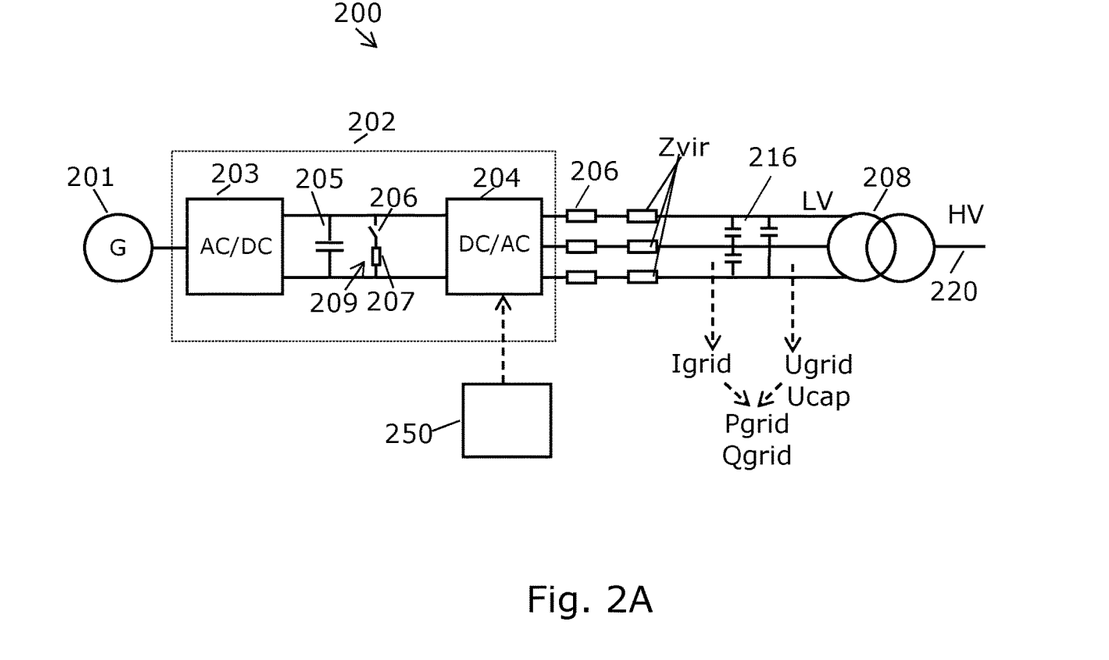
FIG. 2A shows an example of a power system of a wind turbine or a power generating unit.

FIG. 2A shows an example of a power system 200 of a wind turbine 100 according to an embodiment. The power system comprises a generator or power source 201 and a power converter 202. The power converter 202 comprises a machine side converter 203, a line side inverter 204. The power converter 202 may further comprise a DC-link 205 and a resistor 207 connected with a controllable switch 206. The resistor and switch forms a power dissipation device, also known as a chopper 209, for dissipating active power. The DC-link 205 comprises one or more DC-link capacitors which are charged by the DC output current from the generator side converter 203 and which supplies DC power to the line side inverter 204. The output AC current from the line side inverter 204 may be supplied via output inductors 206 and possibly via a wind turbine transformer 208 to the grid or power line 220. In this example, the output AC current is a 3-phase current output. Harmonic filter capacitors 216 may be arranged between the conductors of the output, which together with the inductors 206, forms a harmonic filter which converts the square wave voltage signals from the line side inverter 204 to voltage sinusoidal signals.

The power line 220 may be a medium voltage power bus which receives power from other wind turbines 100. The power line 220 may be connected with a high voltage network, e.g. via further transformers. Thus, the power line 220 and one or more power systems 200 of corresponding wind turbines constitutes a wind power plant or park arranged to supply power to a utility grid for distribution of electrical power. The power line 220 and the high voltage network is commonly referred to as a power grid herein.

The power converter 202 may be full-scale converter configured according to different principles including forced-commutated and line-commutated converters.

The power system 200 is principally illustrated and therefore does not explicitly reveal that the system may be a three phase system. However, principles of the described embodiments apply both to single and multi-phase systems.

The line side inverter 204 uses some variant of pulse width modulation (PWM) for converting the DC power into AC power. The control system 250 is used for controlling the modulation of the line side inverter 204 and for controlling the active power P and the reactive power Q generated by the line side inverter 204.

FIG. 2A shows that the grid voltage Ugrid, here the voltage at the low voltage LV side of the transformer 208, can be measured. The grid voltage Ugrid can be used for determining a virtual synchronous machine angle θVSM (as described elsewhere) and for controlling the power output of the converter, based on determining the active power Pgrid from grid voltage Ugrid and grid current Igrid. The reactive power Qgrid may similarly be determined from Ugrid and Igrid. Alternatively, the grid voltage Ugrid may be measured on the high voltage HV side of the transformer and corrected based on the turns ratio of the transformer, or the internal voltage magnitude reference Vqref is used instead of the measured voltage Ugrid. In an alternative, an internal voltage magnitude reference such as Vqref, Vdqref or Vαβref may be used for determining Pgrid and consequently the synchronous machine angle θVSM. The grid current Igrid supplied to the grid can also be measured.

Figure 2B:
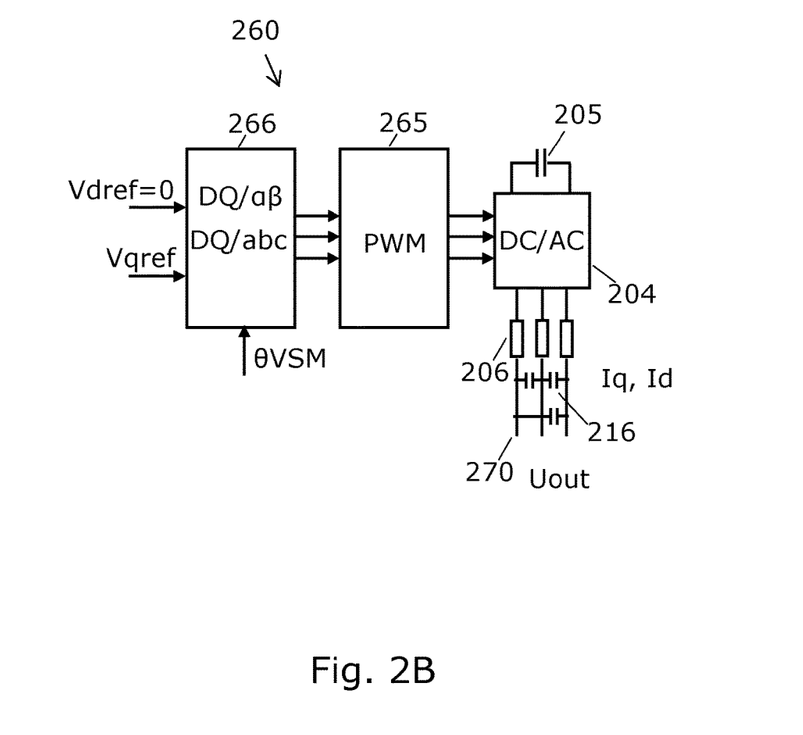
FIG. 2B shows control components arranged for controlling the generation of active power and reactive power supplied to the grid at the power output of the wind turbine or power generating unit.

FIG. 2B shows an example of control components 260 arranged for controlling the generation of active power Pgrid and reactive power Qgrid supplied to the grid at the power output 270 of the wind turbine 100. That is, the control components 260 may be arranged for controlling the output active power Pgrid and the output voltage magnitude at the low voltage side LV, alternatively for controlling the output active power Pgrid and the output reactive power Qgrid at the low voltage side LV. The control components 260 such as the frame conversion unit 266 and the pulse width modulator 265 may form part of the control system 250 or receive control signals from the control system 250.

References for the active and reactive power may be received from a power plant controller, PPC, or a grid operator, TSO, or determined from active and reactive power references, e.g. from the grid operator.

The active power, Pgrid, is controlled via the virtual synchronous machine angle θVSM. In short, the synchronous machine angle acceleration (the double-time derivative of θVSM) corresponds to the difference between a power reference Pref for a desired power output of the wind turbine and a grid power Pgrid supplied by the wind turbine to a power grid. The synchronous machine angle θVSM is determined according to a grid forming inverter scheme such as a virtual synchronous machine control scheme. A grid forming inverter scheme models the inherent rotating mass inertia of synchronous generators. By modelling the inertia, the inverter may provide improved grid stability since the grid forming inverter model opposes changes in grid frequency. That is, an increase in the grid frequency causes an increase of the kinetic energy and rotation frequency of the inertia but with a response time determined by the inertia. Oppositely, a decrease in the grid frequency causes a decrease of the kinetic energy and frequency of the inertia but with a response time determined by the inertia. In a wind turbine, the increase or decrease of the kinetic energy of the modelled synchronous generator causes an increase or decrease of the kinetic energy of the rotor 102.

Examples for determining the synchronous machine angle θVSM is given elsewhere in this description.

The synchronous machine angle θVSM may be used to transform the signals from the rotating DQ frame into a non-rotating frame such as the αβ or abc frame, or vice-versa. Based on the synchronous machine angle θVSM and voltage magnitude reference Vqref, control signals for the desired active power and reactive power are determined.

The synchronous machine angle θVSM is defined in a rotating DQ frame defined by the angular position θVSM and rotating with the frequency ωVSM. Based on the synchronous machine angle θVSM, control signals, i.e. the angle of the modulation voltage signals for the pulse-width-modulator PWM, 265 are determined and transformed into a non-rotating frame such as the αβ or abc frame. The modulation voltage reference signal controls the active and reactive power Pgrid and Qgrid.

The frame conversion unit 266 transforms the control signal from the DQ frame into the αβ or abc frame and determines the sinusoidal voltage references for the PWM 265. The frame converted output signals from the frame conversion unit 266 are converted by the pulse-width-modulator PWM, 265 into a modulation signal for the grid side converter 204 in order to generate the desired active power and reactive power and/or voltage magnitude.

The voltage magnitude reference Vqref is provided as a reference for a desired grid voltage or a desired reactive power Qgrid to be generated by the inverter 204. The voltage magnitude reference Vqref may be determined based on a difference between a reactive power reference Qref and an actual reactive power Qgrid delivered to the grid. Thus, the reactive power Qgrid to be generated by the line side inverter 204 can be controlled based on a voltage magnitude reference Vqref.

The voltage magnitude reference Vqref may be defined in the DQ frame which rotates with the rotational speed ωVSM of the virtual synchronous machine, which in a steady state condition may equal the fundamental frequency such as 50 Hz of the AC grid voltage. The voltage magnitude reference Vqref, or a modification thereof as described in the following, may be converted from the DQ frame to the αβ or abc frame and outputted from the frame conversion unit 266 as a control signal to the pulse-width-modulator PWM, 265 which determines the modulation signal for the grid side converter 204.

Depending on the governing grid codes for a wind turbine power plant, the power converters of wind turbines may be required to be operated as virtual synchronous machines for grid currents Igrid below a given overcurrent threshold Imax. According to some grid codes, this overcurrent threshold is suggested to be around 1.5 pu. If the overcurrent threshold is high, grid disturbances like phase jumps may lead to a high power peak or torque peak in the generator side and drive train and consequently cause an undesired increase in the mechanical load.

In principle, when a too high peak of the generator power Pgen is detected, a reduction of the generator power Pgen could be invoked by reducing the power reference Pref. However, due to the inertia of the virtual synchronous model such a reduction would only lead to a slow reduction of the generator power Pgen or generator torque Tgen.

Examples below in FIGS. 3A-3B, FIG. 4, FIGS. 5 and 6A-6B presents solutions to this problem which are based on providing an adaptive grid overcurrent threshold Imax instead of a fixed overcurrent threshold. According to the solutions, the grid overcurrent threshold Imax is changed based on the generator power Pgen or generator torque Tgen in comparison with threshold values Pmax, Tmax. When the generator power Pgen or generator torque Tgen is above the threshold value, the overcurrent threshold Imax is decreased to limit the generator power Pgen and generator torque Tgen to reduce the mechanical load. For example, the grid overcurrent threshold Imax may be set to 1.5 pu as default and the threshold value of the reduced generator power maximum Pmax may be set to 1.2 pu. In this case, if the generator power Pmax goes above 1.2 pu, the overcurrent threshold Imax is immediately decreased to keep the generator power below 1.2 pu. After the generator power Pgen becomes below 1.2 pu, the overcurrent threshold is increased to 1.5 pu again.

The solutions are based on a current limiting method which is based on the idea of inserting a virtual impedance Zvir between the output of the line side inverter 204 and the grid or the grid connection such as the transformer 208. The virtual impedance Zvir is principally illustrated in FIG. 2A. The virtual impedance Zvir may be determined for one or more phases. Here the virtual impedance Zvir is determined for commonly for all phases, i.e. as the same virtual impedance. The virtual impedance could also be individually determined for each phase. By increasing the resistive and/or the reactive value of the virtual impedance Zvir, the output current drawn from the output of the line side inverter can be reduced. As illustrated in connection with FIG. 4 and FIG. 5, the power value Pvir of the virtual resistance part Rvir of the virtual impedance Zvir, i.e. the virtual power dissipation, is used in the swing equation of the virtual synchronous generator implementation to reduce acceleration of the virtual synchronous generator during overcurrent situations and thereby the output current Igrid of the line side inverter 204.

Figure 6A:
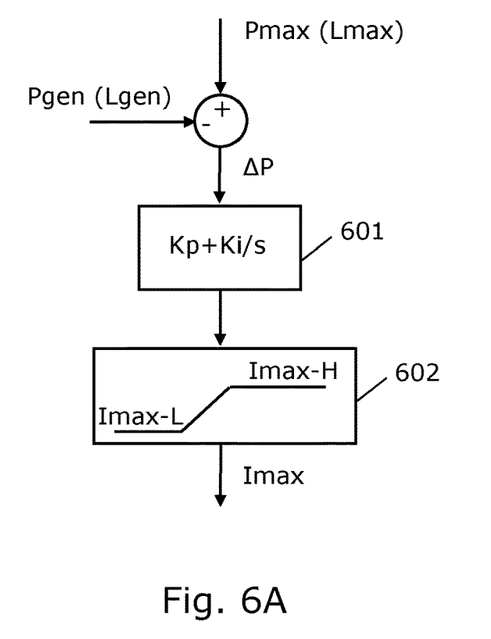
FIGS. 6A and 6B show examples of determining the maximum grid current value adaptively dependent on the generator load and a maximum generator load.
Figure 6B:
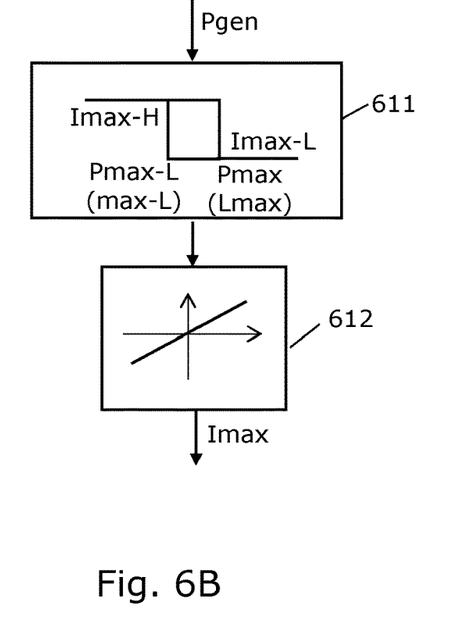

An overcurrent may be defined as an output current of the line side inverter which is greater than the overcurrent threshold value Imax. The overcurrent threshold value Imax may be a predetermined value. However, as will be illustrated a fixed Imax may led to high peaks in the generator power Pgen when the delivered grid current exceeds the overcurrent threshold value Imax. Therefore, the adaptive determination of Imax as illustrated in FIGS. 6A-6B is devised.

Figure 3A:
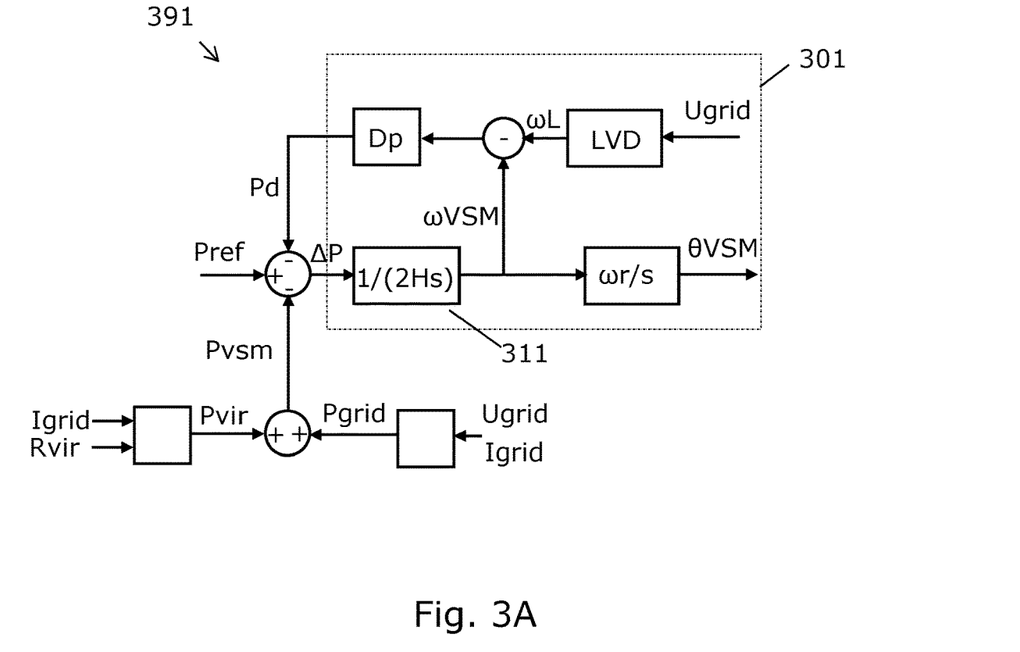
FIG. 3A and FIG. 3B show examples of control systems for determining the synchronous machine angle of the virtual synchronous generator.
Figure 3B:
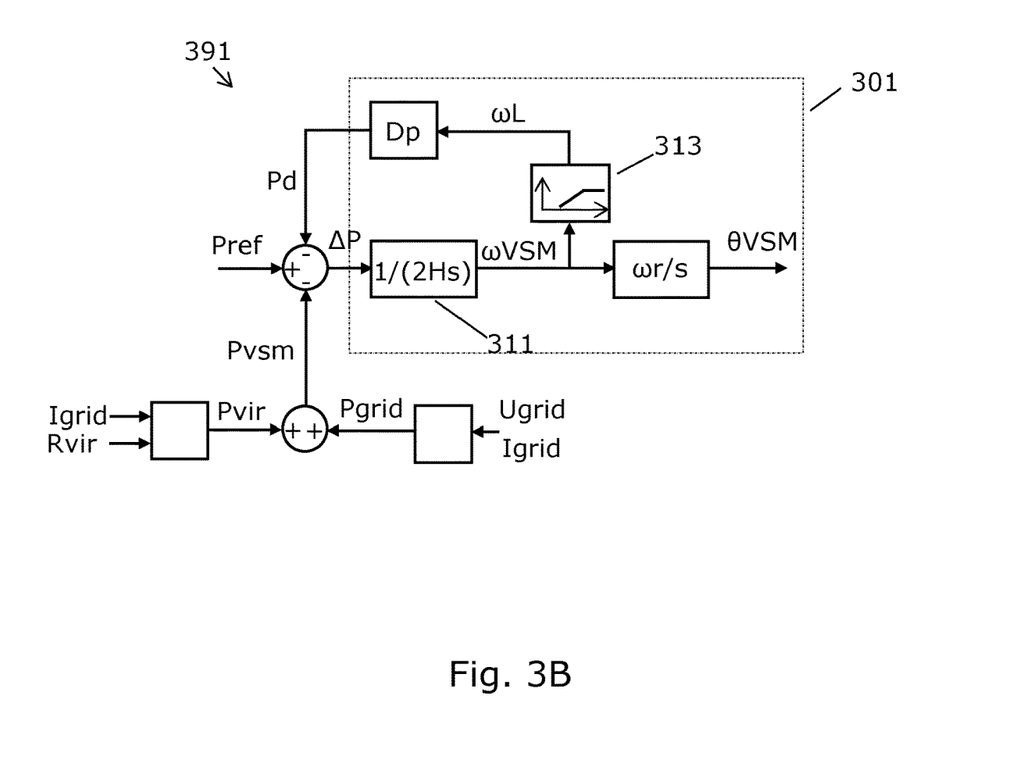

FIG. 3A and FIG. 3B show examples of control systems 391 for determining the synchronous machine angle θVSM of the virtual synchronous generator.

The synchronous machine angle θVSM is determined based on a virtual synchronous machine control concept which aims at generating a power response which corresponds to the power response from a real synchronous generator, including the inertia of the synchronous generator.

The power error ΔP is determined as the difference Pref−Pd−Pvsm, where Pref is a power reference for the desired active power output of the wind turbine, Pd is a damping power determined according to the virtual synchronous model 301, and Pvsm is a virtual grid power. The virtual grid power Pvsm is given as the sum of the measured grid power Pgrid and the virtual power Pvir of the virtual resistor Rvir. Under steady state conditions, the value of the power error ΔP is zero.

In response to a change in the grid power Pgrid, e.g. due to an decrease in the grid voltage Ugrid and a corresponding increase in the grid current Igrid, the power error ΔP becomes non-zero, which causes the angle θVSM to increase or decrease to reduce the power error ΔP. For example, in an overcurrent situation where Pgrid decreases, e.g. due to a grid short-circuit, the power error value ΔP becomes positive and the synchronous machine speed ωVSM will increase.

Thus, in response to fluctuations in e.g. the grid power Pgrid, the synthetic inertial response value becomes non-zero, which causes the virtual machine to either accelerate or decelerate to reach a new equilibrium condition. The new equilibrium is reached when the virtual grid power Pvsm is again following Pref.

The virtual synchronous machine control concept is utilized on the line side inverter 204 using a swing equation to calculate θVSM.

FIG. 3A shows an example of an implementation of the virtual synchronous model 301. The virtual synchronous model 301 includes a closed loop where the virtual synchronous machine rotational speed ωVSM is determined based on a combination a feedback of a damping power Pd, a power reference Pref for the desired active power output of the wind turbine, the active grid power Pgrid supplied by the wind turbine to the grid via the power line 220, the virtual resistor power Pvir and an inertial integration model 311. The inertial integration model 311 is implemented as 1/(2Hs) where H is the inertia time constant and 1/s is the integration in s-domain. Accordingly, the combination of powers Pref−Pd−Pgrid−Pvir=ΔP is used as input for the inertial integration model 311.

Since the derivative of the synchronous machine rotational speed ωVSM is proportional to the deviation between the power reference Pref and the virtual grid power Pvsm, the integration of the difference ΔP gives the synchronous machine rotational speed ωVSM.

The grid power Pgrid can be determined based on the measured grid voltage Ugrid—or internal voltage references such as the voltage magnitude reference Vqref, or transformations thereof such as Vαβref or Vdqref—and the measured grid current Igrid.

The damping power Pd is determined as the difference between the rotational speed of the grid ωL and the synchronous machine rotational speed ωVSM multiplied with the damping factor Dp. The rotational speed of the grid ωL, i.e. the grid frequency is determined from the measured grid voltage Ugrid.

The synchronous machine angle θVSM is determined based on an integration of the synchronous machine rotational speed ωVSM according to ωr/s, where ωr is the rated synchronous generator speed.

FIG. 3B shows an alternative virtual synchronous model 301 which is not based on a measured grid voltage Ugrid, but instead the rotational speed of the grid ωL is determined based on a high-pass filtering of the determined synchronous machine rotational speed ωVSM, i.e. by determining the rotational speed of the grid ωL as the output of the high-pass filter 313 which is arranged to filter the inputted synchronous machine rotational speed ωVSM.

Thus, the alternative virtual synchronous model 301 is not based on a measured grid voltage Ugrid, but the damping part, e.g. the damping power Pd, is determined based on a high-pass filtering 313 of the synchronous machine rotational speed ωVSM.

In general, the virtual synchronous model 301 determines the angle of the virtual machine θVSM based on the combination of powers Pref, Pd, Pgrid, Pvir, the inertial integration model 311, e.g. implemented as 1/(2Hs) and a feedback of the damping power Pd determined based on ωVSM and an integration of ωVSM. In other words, the synchronous machine rotational speed ωVSM and the synchronous machine angle θVSM are determined so that they are indicative of a integrated deviation between a power reference Pref for a desired power output of the wind turbine and the virtual grid power Pvsm.

The control systems 391 can be implemented based on power values Pref, Pd, Pgrid, Pvir but may equivalently be implemented based on corresponding torque values Tref, Td, Tgrid, Tvir based on the relationship where power equals torque times rotation frequency, e.g. the synchronous machine rotational speed ωVSM.

Figure 4:
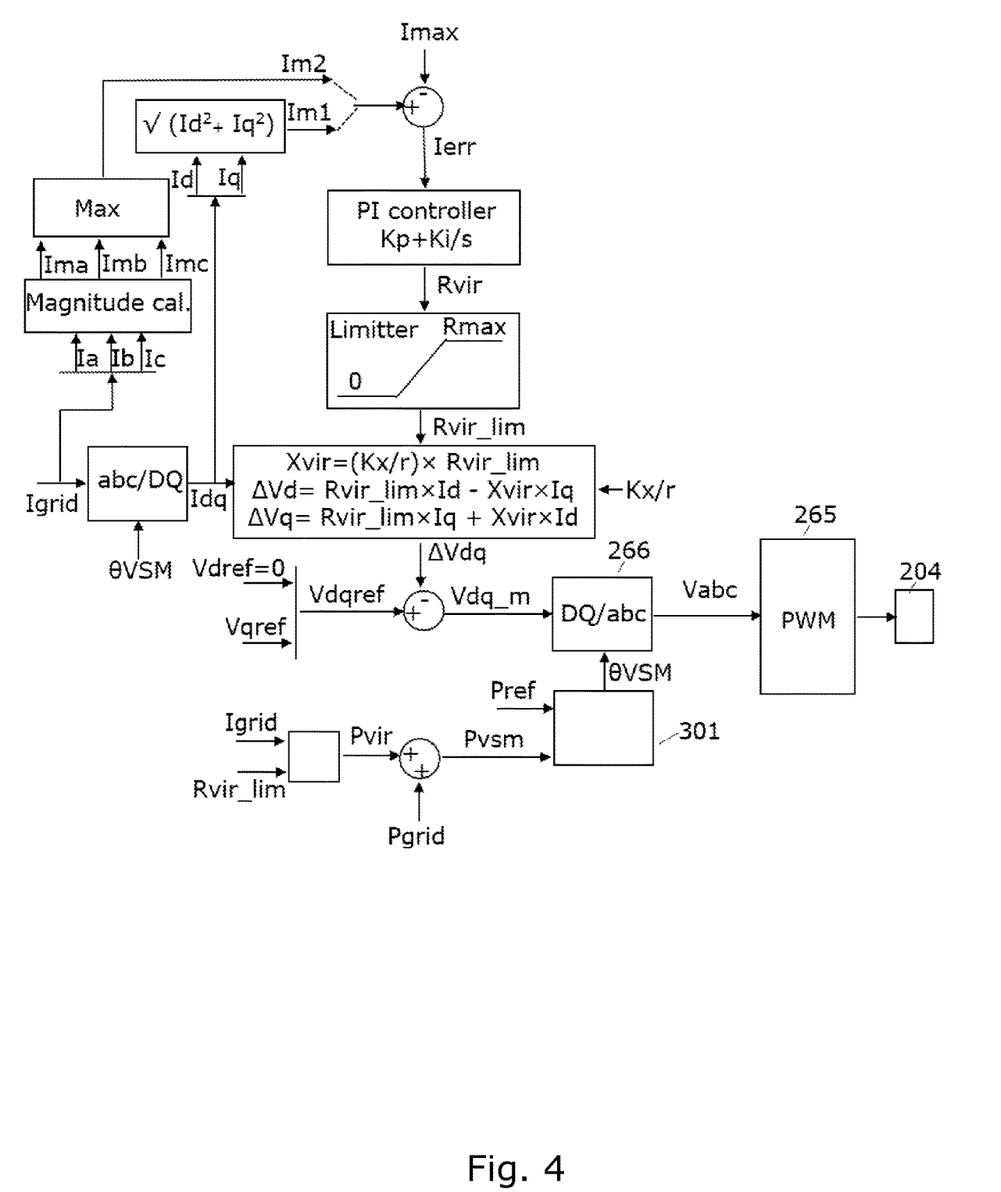
FIG. 4 and FIG. 5 show examples for implementing the virtual synchronous generator with the current limiting method.
Figure 5:
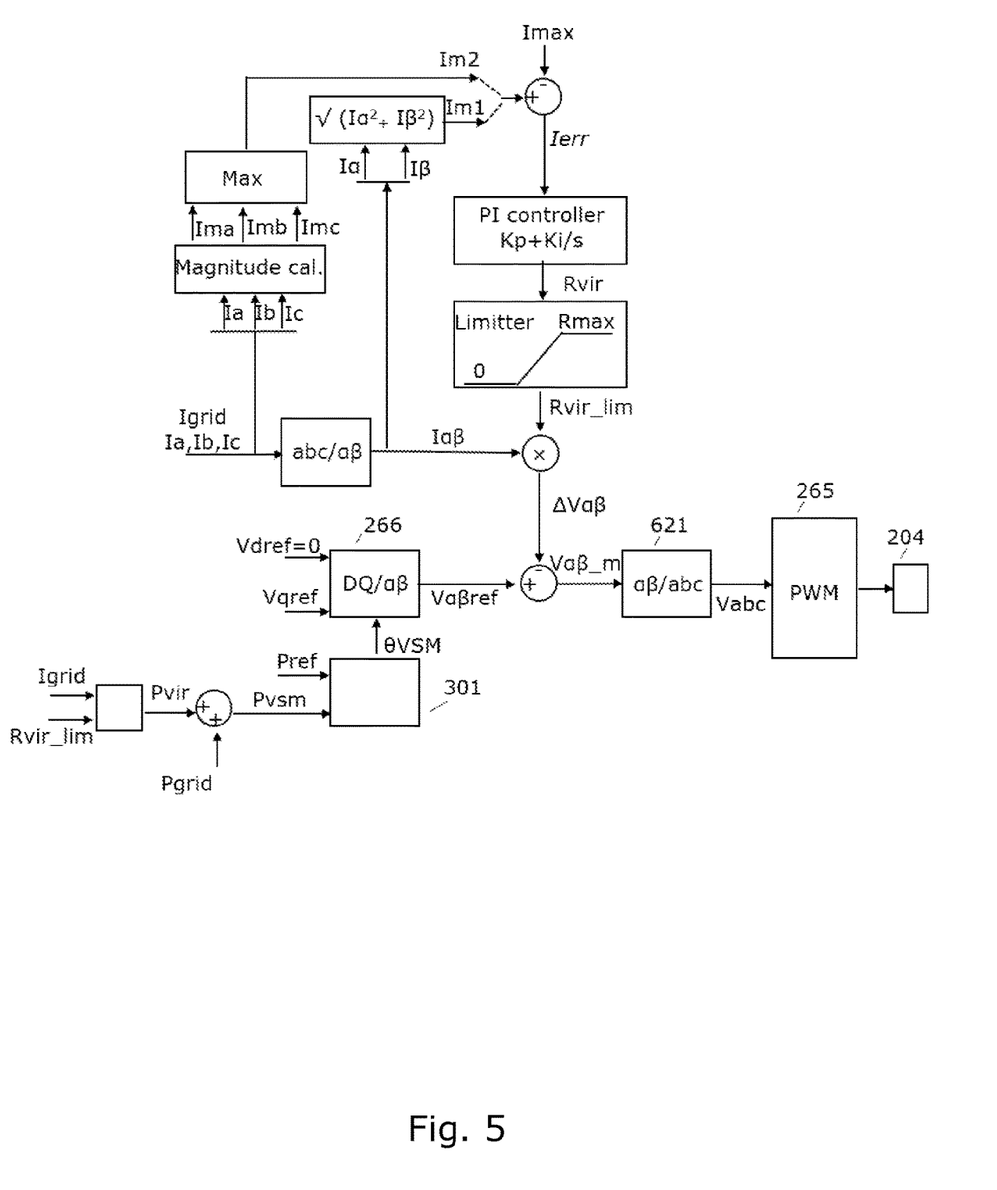

FIGS. 4 and 5 show examples of determining the virtual impedance Zvir and feeding the virtual resistor power Pvir into the virtual synchronous model 301.

A current magnitude Im1 or Im2 is determined based on the grid current Igrid. The current magnitude Im1 or Im2 is determined so that the current magnitude represents the instantaneous current magnitude of the current. In this context, instantaneous may be the actual current amplitude per sample, or an average obtained over two or more samples, such as 10 samples.

The current magnitude Im1, Im2 may be determined based on the current components Ia, Ib, Ic in the reference frame, i.e. the current amplitudes of the available phases, based on the current components Id and Iq (FIG. 4) in the rotation dq-frame and/or based on the current components Iα and Iβ (FIG. 5).

The current components Id, Iq are obtained by transforming the current signals Ia, Ib, Ic of the three-phase current signal Igrid from the measurement frame abc to the DQ frame which rotates with the virtual synchronous angular frequency ωVSM. The abc/DQ transformation is performed based on the virtual synchronous machine angle θVSM. The abc/DQ transformation is the projection of the current quantities Ia, Ib, Ic—or other quantities such as voltages—onto the two-axis frame DQ which rotates according to the angle θVSM.

The current components Iα, Iβ are obtained by transforming the current signals Ia, Ib, Ic of the three-phase current signal Igrid from the measurement frame abc to the αβ frame which is stationary. The abc/αβ transformation is the projection of the current quantities Ia, Ib, Ic—or other quantities such as voltages—onto the two-axis stationary frame αβ.

The current magnitude Im1 may be determined as the square root of the squares of the current components Iα, Iβ or the squares of the current components Id, Iq. The current components Iα, Iβ or Id, Iq may be determined for each sample, possibly as an average over a few samples.

Alternatively, the current magnitude Im2 may be determined based on the phase current magnitudes Ima, Imb, Imc, e.g. determined as the current amplitude or peak current value within a period, of the current signals. Further, the current magnitude Im2 may be determined as the maximum of the determined current magnitudes Ima, Imb, Imc, or in other ways dependent on the current magnitudes.

If a fast response is needed, i.e. if a fast compensation via the virtual impedance Zvir is needed, the first alternative of the current magnitude Im1 may be preferred, due to the faster computation of Im1 compared with Im2.

If a better performance in unbalanced situations is needed, the second alternative of the current magnitude Im2 may be preferred. In unbalanced cases, the magnitude of one phase, for example Ima, may be much larger than other phases (Imb and Imc), consequently Im2 would be larger than Im1. So, If Im2 is selected to limit the current, a suitable larger virtual impedance may be inserted.

The virtual impedance value Zvir is determined by initially determining the virtual resistance part Rvir of the virtual impedance Zvir. The determination of the reactive part Xvir of the virtual impedance Zvir is determined based on the initially determined virtual resistance Rvir, but the determination of Xvir is optional since the method also works without determining the reactive part Xvir. Advantageously, Xvir may provide more independent active and reactive power control loops during overcurrent conditions.

The virtual resistance Rvir is determined based on the current difference or current error Ierr, i.e. the difference between the current magnitude Im1 or Im2 and the overcurrent threshold value Imax. Consequently, the virtual reactance Xvir and the virtual impedance Zvir is also determined based on the current difference Ierr. When the current magnitude Im1, or Im2 is lower than Imax, the current difference Ierr becomes negative and the virtual impedance Zvir is reduced (if not already equal to zero) until it is saturated to the zero value. Accordingly, in normal operation Zvir and Pvir equals zero values.

In this example, the virtual resistance Rvir is determined using a controller. For example, the controller may be an integral controller (I-controller), proportional controller (P-controller) or a proportional-integral controller (PI-controller). Accordingly, the control algorithm of the controller may include a proportional part which determines a value which is proportional with the current difference Ierr and/or an integral part which determines a value which is proportional with a time integral of the current difference Ierr. Accordingly, the virtual resistance Rvir is obtained based the values determined by the P-controller and/or the I-controller, or the PI-controller.

The integral part of the controller comprises an integral gain Ki which may be determined dependent on the current difference Ierr, such as the sign of the current difference Ierr. For example, in order to achieve a fast control action when the current difference Ierr is positive, i.e. when the current magnitude Im1, Im2 is greater than Imax, the integral gain Ki may be set to a predetermined relative larger gain Ki1. For negative current differences Ierr, the integral gain Ki may be set to a predetermined relative smaller gain Ki2 to achieve a more stable response during unbalanced situations, where Im1/Im2 may oscillate. Furthermore, the integral gain Ki could also depend on the magnitude of the positive or negative difference Ierr, i.e. by having predetermined gain factors Ki for different signs and magnitudes of the current error Ierr. Therefore, the integral gain Ki may be determined from two or more predetermined gains. In the above example with two gains Ki1 and Ki2, Ki1 is greater than Ki2. Thus in an example, when Ierr>0, Ki=Ki1 is selected to limit the grid current fast. When Ierr<0, Ki=Ki2 is selected to have a stable response for the unbalanced cases.

The determined virtual resistance value Rvir may be limited by the limiter according to a lower minimum limit Rmin and/or an upper maximum limit Rmax to avoid determination of negative resistance values and/or very large values. The output from the limiter is referred to as Rvir_lim.

As illustrated in FIG. 4, the virtual reactance value Xvir may be determined based on the determined virtual resistance Rvir or the limited virtual resistance Rvir_lim. For example, the virtual reactance value Xvir may be determined dependent on a predetermined factor "Kx/r" which determines a ratio between the virtual reactance value Xvir and the virtual resistance value Rvir. The Kx/r factor may be an empirically determined factor, e.g. determined based required damping and grid conditions. For example, the Kx/r factor could be a value in the range from zero to ten.

The voltage $\Delta Vdq$ over the virtual impedance Zvir is determined as shown in FIG. 4 as $\Delta Vd=Rvir\_lim \times Id - Xvir \times Iq$ and $\Delta Vq=Rvir\_lim \times Iq + Xvir \times Id$. For that purpose, the grid current Igrid is transformed into Idq with components Id, Iq in the DQ frame and the impedance voltage is determined in the DQ frame. If Xvir is not determined, Xvir is simply set to zero in the equations.

In the example in FIG. 5, the voltage $\Delta V\alpha\beta$ over the virtual impedance Zvir is determined based on the grid current Igrid transformed into $I\alpha\beta$ in the $\alpha\beta$ frame according to the Clarke transformation. The voltage may be determined as $\Delta V\alpha = Rvir\_lim \times I\alpha + (Xvir/\omega VSM) \times d(I\alpha)/dt$ and $\Delta V\beta = Rvir\_lim \times I\beta + (Xvir/\omega VSM) \times d(I\beta)/dt$ (not shown in FIG. 5).

Alternatively, as shown in FIG. 5, in order to avoid the derivative part, only the virtual resistance Rvir or the limited resistance Rvir_lim is determined and the voltage over the virtual resistance is determined as $I\alpha\beta \times Rvir\_lim$ or $I\alpha\beta \times Rvir$.

As another alternative the voltage $\Delta Vabc$ over the virtual impedance Zvir may be determined by multiplying the current components Ia, Ib, Ic with the resistance and/or reactance components of the virtual impedance Zvir.

In general as illustrated with examples in FIG. 4 and FIG. 5, the virtual voltage $\Delta V\alpha\beta$, $\Delta Vdq$ over the virtual impedance Zvir is determined based on the virtual impedance value Zvir and the grid current Igrid, or a transformation thereof.

In FIG. 4, the virtual voltage $\Delta Vdq$ is combined, here subtracted, with the voltage reference Vdqref to generate the modified voltage reference Vdq_m.

The virtual power Pvir of the virtual resistor Rvir is determined as $Pvir=1.5 \times Im1^2 \times Rvir$ or $1.5 \times Im2^2 \times Rvir$.

The virtual grid power Pvsm is determined as the sum of the virtual power Pvir and the grid power Pgrid which may be determined based on Ugrid and Igrid.

Alternatively, the virtual grid power Pvsm may be determined as $Pvsm=1.5 \times (V\Delta ref \times I\alpha + V\beta ref \times I\Delta)$ or $Pvsm=1.5 (Vdref \times Id + Vqref \times Iq)$, where $V\alpha ref$ and $V\beta ref$ are the components of $V\alpha\beta ref$, and where Vdref and Vqref are the components of Vdqref. Accordingly, the virtual grid power Pvsm may alternatively be determined based on the voltage magnitude reference Vqref and the grid current Igrid, or transformations thereof according to the equations.

Thus, in general the virtual grid power Pvsm may be determined based on the virtual resistance Rvir and the grid current Igrid or transformations therefrom, or based on the voltage references (Vdqref, $V\alpha\beta ref$) and the grid current Igrid or transformations therefrom.

As described in connection with FIGS. 3A and 3B, based on the deviation $\Delta P$ between the power reference Pref for a desired power output of the power generating unit and the virtual grid power Pvsm combined with a damping power (Pd), the virtual synchronous machine rotational speed $\omega VSM$ and/or the synchronous machine angle $\theta VSM$ is determined by the virtual synchronous model 301, where the derivative of the synchronous machine rotational speed ($\omega VSM$) is indicative of the power deviation $\Delta P$.

The voltage reference Vabc for controlling the line side inverter 204 to generate the desired reactive power Qgrid is determined by the frame conversion unit 266 based on the virtual synchronous machine rotational speed or angle $\omega VSM$, $\theta VSM$, and a combination of the virtual voltage $\Delta V\alpha\beta$, $\Delta Vdq$ and the voltage magnitude reference Vdqref, here the difference Vdqref−$\Delta Vdq$. Here it is noted that Vdref may be zero, so that Vdqref equals Vqref. The voltage magnitude reference Vqref is provided to achieve a desired reactive power Qgrid to be generated by the line side inverter 204. Thus, the voltage reference Vdqref is the voltage reference in the DQ frame generated based on the voltage magnitude reference Vqref.

The virtual synchronous machine angle $\theta VSM$ is used by the frame conversion unit 266 to perform the transformation of the voltage signal Vdq_m from the DQ frame into the voltage signal Vabc in the abc frame. The voltage signal Vabc is provided as a control signal to the pulse-width-modulator PWM, 265 in order to generate the active power P based on $\theta VSM$ as described in connection with FIG. 2A. The virtual synchronous machine angle $\theta VSM$ is determined as described in connection with FIGS. 3A-B and is used for determining the control signal Vabc via the frame conversion unit 266.

Accordingly, if a positive current error Ierr is generated, the virtual power Pvir determined from the virtual resistance Rvir is added to the grid power Pgrid and results in an increased virtual grid power Pvsm. The increased virtual grid power Pvsm results in reducing the error $\Delta P$ and consequently decreasing of $\theta vsm$. This causes that the angle difference between Vabc and Ugrid is decreased, which causes a decrease in the grid current Igrid supplied by the line side inverter 204 to the grid.

FIG. 5 shows an alternative example for determining and implementing the virtual impedance Zvir and feeding the virtual resistor power Pvir into the virtual synchronous model 301. Here the example, only shows determination of the virtual resistance Rvir.

In this example, the grid current Igrid, i.e. the current components Ia, Ib, Ic, is transformed from the measurement frame abc to $I\alpha\beta$ in the stationary $\alpha\beta$ frame. The abc/$\alpha\beta$ transformation transforms the three vector values in the measurement frame abc to two vector values in the $\alpha\beta$ frame.

The voltage magnitude reference $V\alpha\beta ref$ is the $\alpha\beta$ transformed version of Vdqref, where Vdqref is the voltage reference in the DQ frame generated based on the voltage magnitude reference Vqref.

The virtual synchronous machine angle $\theta VSM$ is used by the frame conversion unit 266 for transforming the Vdqref from the DQ frame into $V\alpha\beta$ in the $\alpha\beta$ frame. The voltage control signal $V\alpha\beta$ is transformed by transform element 621 to the control signal Vabc in the measurement frame abc and is provided as a control signal to the pulse-width-modulator PWM.

The determination of the virtual grid power Pvsm in FIG. 5 is equivalent to the determination of Pvsm in FIG. 4.

The virtual voltages $\Delta V\alpha\beta$ are combined, here subtracted, with the voltage reference $V\alpha\beta ref$ to generate the modified voltage reference $V\alpha\beta\_m$.

The modified voltage reference Vαβ_m is transformed from the αβ frame to voltage control signal Vabc in the measurement frame abc by the αβ/abc transform element 621.

Accordingly, the response of the circuit in FIG. 5 due positive current error Ierr is equivalent to the control response of the circuit in FIG. 4.

FIG. 6A shows a solution for determining the grid overcurrent threshold Imax adaptively. The difference ΔP between the generator power Pgen and the maximum generator power Pmax-H is integrated by the control function 601. The control function may include only an integration function 1/s or an integration function scaled by a gain factor Ki. Optionally, the control function may include a proportional term Kp which may be fixed or variable. The control function 601 may be configured so that the gain factor Ki—which is multiplied with the power difference ΔP or equivalently the integration term of the control function 601—depends on the power difference ΔP, such as the sign of the power difference ΔP.

For example, in order to achieve a fast control action when the power difference ΔP is negative, i.e. when the generator power Pgen is greater than Pmax-H, the integral gain Ki may be set to a predetermined relative larger gain Ki1. For positive power differences ΔP, the integral gain Ki may be set to a predetermined relative smaller gain Ki2 to achieve a more stable response. In this example, the integral gain factor Ki may be set to Ki1 or Ki2, where Ki1 is greater than Ki2. Thus, with ΔP<0, Ki=Ki1 is selected to reduce the overcurrent threshold Imax fast and with ΔP>0, Ki=Ki2 is selected to get back to the predefined and nominal maximum overcurrent threshold Imax robustly. The values of Ki may be determined according to stability criterial of the control system.

The integral gain factor Ki may be determined in other ways dependent on the power difference ΔP. For example, Ki may be determined dependent on the magnitude of ΔP and/or the sign of ΔP. The gain factor Ki may be determined dependent on a function such as a continuous function which depends on ΔP or dependent on a look-up table that contains two or more values to be selected dependent on the power difference ΔP.

The limit function 602 is configured to set an upper maximum grid current value Imax-H and a lower maximum grid current value Imax-L for limiting the output value of the control function 601 so that the maximum current value Imax provided by the limit function 602 is limited to a value between the lower maximum current value Imax-L and the upper maximum current value Imax-H.

With the solution based on the control function 601, the maximum current value Imax will approach the lower maximum current value Imax-L, e.g. 1.2 pu. if the generator power Pgen is greater than a maximum generator power Pmax-H. If the generator power Pgen is smaller than the maximum generator power Pmax-H, the maximum grid current value Imax will approach the upper maximum current value Imax-H, e.g. 1.5 pu.

FIG. 6B shows an alternative solution for determining the grid overcurrent threshold Imax adaptively. The hysteresis function 611 outputs either the the lower maximum grid current value Imax-L if the measured generator power Pgen is greater than the maximum generator power Pmax or outputs the upper maximum grid current value Imax-H if the measured generator power Pgen is smaller than the low maximum generator power Pmax-L.

A rate limit function 612 is provided to limit the rate of changes of the output from the hysteresis function so that the rate of change of changes between the upper maximum grid current value Imax-H and the lower maximum grid current value Imax-L is limited according to the slope of the rate limit function 612.

The slope Ri of the rate limit function 612 may depend on whether the generator power Pgen is greater than the maximum generator power Pmax or is smaller than the low maximum generator power Pmax-L, e.g. so that the slope Ri=Ri1 is selected for Pgen>Pmax and the slope Ri=Ri2 is selected for Pgen<Pmax-L, where Ri1>Ri2, to achieve a fast reduction of an overcurrent threshold Imax if required, and a robust return to the nominal maximum overcurrent threshold Imax.

The examples in FIG. 6A and FIG. 6B are based on the generator power Pgen, but can equivalently be based on the generator torque Tgen or other generator loads Lgen. Accordingly, the maximum generator power Pmax, a maximum generator torque Tmax or other maximum generator load Lmax are equivalent. Similarly, the low maximum generator power Pmax-L, a low maximum generator torque Tmax-L or other low maximum generator load Lmax-L are equivalent.

Figure 7:
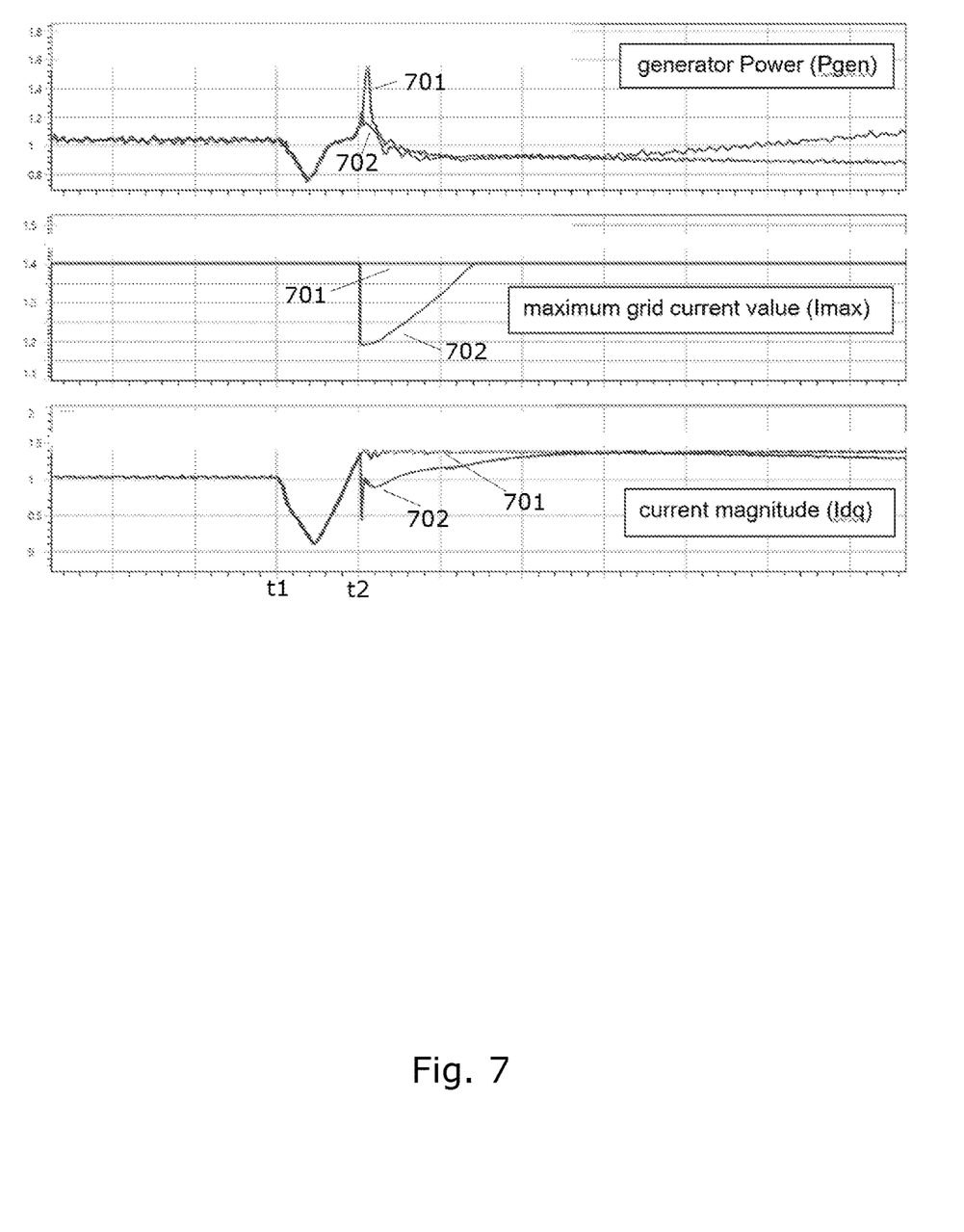
FIG. 7 illustrates simulation results showing how the adaptive determination of the maximum grid current value limits the peak generator load.

FIG. 7 illustrates simulation results of an implementation with the adaptive determination of the maximum grid current value Imax (curves with reference 702) and simulation results of an implementation with a fixed maximum grid current Imax (curves with reference 701).

At t1, a grid fault such as a phase jump occurs.

In the generator power simulation, curve 701 shows a high peak force at t2 (1.5 pu) and therefore a large generator load, whereas curve 702 shows that the adaptive determination of the maximum grid current value Imax limits the power peak significantly to 1.2 pu.

The middle graph shows that the maximum grid current value (Imax) is reduced from Imax-H to Imax-L at t2 and increases back to Imax-H when Pgen falls below Pmax shortly after t2.

The lower graph shows that the grid current magnitude (Idq) is limited to 1.5 pu in curve 701 for the fixed Imax, while the current magnitude is reduced in curve 702 due to the adaptively determined reduction of Imax.

The invention claimed is:

1. A method for limiting generator loads in a wind turbine comprising a power converter with a line side inverter arranged to supply power to a power grid, the method comprising:

determining a maximum grid current value based on a measured generator load and a limit function which sets an upper maximum grid current value and a lower maximum grid current value such that (i) the maximum grid current value moves towards the lower maximum current value if generator load is greater than a maximum generator load and (ii) the maximum grid current value moves towards the upper maximum current value if the generator load is smaller than the maximum generator load or is smaller than a low maximum generator load;

determining a virtual impedance value based on a current difference between a current magnitude associated with a grid current and the maximum grid current value, where the virtual impedance value comprises a virtual resistance value;

determining a virtual voltage drop over the virtual impedance value based on the virtual impedance value and the grid current;

determining a virtual grid power based on (i) the virtual resistance value and the grid current or (ii) the grid current and a voltage magnitude reference for a desired grid voltage or a desired reactive power to be generated by the line side inverter;

determining a virtual synchronous machine angle based on a power reference for a desired power output of the power generating unit and the virtual grid power; and determining a voltage reference for controlling the line side inverter to generate power based on the virtual synchronous machine angle, the virtual voltage drop, and the voltage magnitude reference.

2. The method according to claim 1, wherein determining the maximum grid current value comprises determining a load difference between the measured generator load and the maximum generator load, integrating the load difference, and determining the maximum grid current value based on the integrated load difference subject to the upper maximum grid current value and the lower maximum grid current value of the limit function.

3. The method according to claim 2, wherein integrating the load difference comprises multiplying the load difference with a gain factor which depends on the load difference.

4. The method according to claim 1, wherein determining the maximum grid current value comprises selecting the lower maximum grid current value if the measured generator load is greater than the maximum generator load, selecting the upper maximum grid current value if the measured generator load is smaller than the low maximum generator load, and determining the maximum grid current value by limiting a rate of change of changes between the upper maximum grid current value and the lower maximum grid current value.

5. The method according to claim 1, wherein the virtual synchronous machine angle is determined so that a double derivative of the angle is indicative of a deviation between a power reference and the virtual grid power combined with a damping power.

6. The method according to claim 1, wherein the virtual resistance value is determined based on a control algorithm, where the control algorithm comprises a proportional part which determines a value which is proportional with the current difference or an integral part which determines a value which is proportional with a time integral of the current difference.

7. The method according to claim 1, wherein a virtual reactance value of the virtual impedance value is determined dependent on a predetermined factor defining a ratio between the virtual reactance value and the virtual resistance value.

8. The method according to claim 1, wherein the current magnitude is determined as the maximum current magnitude of the current magnitudes of current phases of the grid current, or as the magnitude of a current vector of the grid current or a transformation thereof.

9. The method according to claim 1, where a virtual synchronous machine rotational speed is determined based on a combination of a feedback of a damping power, the power reference, the virtual grid power, and an inertial integration model, where the synchronous machine angle is determined based on an integration of the synchronous machine rotational speed, and where the damping power is determined based on the virtual synchronous machine rotational speed.

10. The method according to claim 1, comprising:
obtaining a network voltage at a connection point of the output of the power generating unit;
determining a rotational speed of the grid based on the network voltage; and
determining a damping power based on a virtual synchronous machine rotational speed and the rotational speed of the grid.

11. The method according to claim 1, comprising:
determining a modified voltage reference based on the voltage magnitude reference and the virtual voltage drop; and
determining the voltage reference based on the modified voltage reference.

12. The method according to claim 1, wherein the voltage magnitude reference is defined in a rotating direct quadrature frame.

13. The method according to claim 12, wherein the method comprises transforming the voltage magnitude reference to a transformed voltage magnitude reference in non-rotating target frame and wherein a modified voltage reference is determined by combining said transformed voltage magnitude reference with the virtual voltage drop.

14. A wind turbine control system arranged for limiting generator loads in a wind turbine comprising a power converter with a line side inverter arranged to supply power to a power grid, the wind turbine control system is arranged to perform an operation for limiting generator loads in the wind turbine, the operation comprising:

determining a maximum grid current value based on a measured generator load and a limit function which sets an upper maximum grid current value and a lower maximum grid current value such that (i) the maximum grid current value moves towards the lower maximum current value if generator load is greater than a maximum generator load and (ii) the maximum grid current value moves towards the upper maximum current value if the generator load is smaller than the maximum generator load or is smaller than a low maximum generator load;

determining a virtual impedance value based on a current difference between a current magnitude associated with a grid current and the maximum grid current value, where the virtual impedance value comprises a virtual resistance value;

determining a virtual voltage drop over the virtual impedance value based on the virtual impedance value and the grid current;

determining a virtual grid power based on (i) the virtual resistance value and the grid current or (ii) the grid current and a voltage magnitude reference for a desired grid voltage or a desired reactive power to be generated by the line side inverter;

determining a virtual synchronous machine angle based on a power reference for a desired power output of the power generating unit and the virtual grid power; and determining a voltage reference for controlling the line side inverter to generate power based on the virtual synchronous machine angle, the virtual voltage drop, and the voltage magnitude reference.

15. A wind turbine, comprising:
a tower;
a nacelle disposed on the tower;
a rotor extending from the nacelle and have a plurality of blades disposed at a distal end thereof;
a control system configured to perform an operation for limiting generator loads in the wind turbine, the operation comprising:
determining a maximum grid current value based on a measured generator load and a limit function which sets an upper maximum grid current value and a lower maximum grid current value such that (i) the maximum grid current value moves towards the lower maximum current value if generator load is greater than a maximum generator load and (ii) the maximum grid current value moves towards the upper maximum current value if the generator load is smaller than the maximum generator load or is smaller than a low maximum generator load;

determining a virtual impedance value based on a current difference between a current magnitude associated with a grid current and the maximum grid current value, where the virtual impedance value comprises a virtual resistance value;

determining a virtual voltage drop over the virtual impedance value based on the virtual impedance value and the grid current;

determining a virtual grid power based on (i) the virtual resistance value and the grid current or (ii) the grid current and a voltage magnitude reference for a desired grid voltage or a desired reactive power to be generated by a line side inverter;

determining a virtual synchronous machine angle based on a power reference for a desired power output of the power generating unit and the virtual grid power; and determining a voltage reference for controlling the line side inverter to generate power based on the virtual synchronous machine angle, the virtual voltage drop, and the voltage magnitude reference.

\* \* \* \* \*